US012809390B2

(12) United States Patent
Nishibeppu et al.

(10) Patent No.: US 12,809,390 B2
(45) Date of Patent: Nov. 24, 2026

(54) AUTOMATIC TRAVEL METHOD, AUTOMATIC TRAVEL SYSTEM, AND AUTOMATIC TRAVEL PROGRAM

(71) Applicant: Yanmar Holdings Co., Ltd., Osaka (JP)

(72) Inventors: Shinya Nishibeppu, Osaka (JP); Yuki Kohori, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 155 days.

(21) Appl. No.: 18/277,254

(22) PCT Filed: Jan. 21, 2022

(86) PCT No.: PCT/JP2022/002128
§ 371 (c)(1),
(2) Date: Aug. 15, 2023

(87) PCT Pub. No.: WO2022/176499
PCT Pub. Date: Aug. 25, 2022

(65) Prior Publication Data

US 2024/0126293 A1 Apr. 18, 2024

(30) Foreign Application Priority Data

Feb. 16, 2021 (JP) ................................. 2021-022414

(51) Int. Cl.
*G05D 1/224* (2024.01)
*G05D 1/248* (2024.01)
(Continued)

(52) U.S. Cl.
CPC ........... *G05D 1/248* (2024.01); *G05D 1/2246* (2024.01); *G05D 1/646* (2024.01); *G05D 2107/21* (2024.01)

(58) Field of Classification Search
CPC .... A01B 69/008; G05D 1/2246; G05D 1/248; G05D 1/249; G05D 1/646; G05D 1/648;
(Continued)

(56) References Cited

U.S. PATENT DOCUMENTS

2002/0099481 A1* 7/2002 Mori ...................... G05D 1/027
318/587
2004/0122588 A1* 6/2004 Ito ........................ G01C 21/367
340/995.25

(Continued)

FOREIGN PATENT DOCUMENTS

JP 2005-016955 A 1/2005
JP 2010-156626 A 7/2010
(Continued)

OTHER PUBLICATIONS

International Search Report dated Feb. 22, 2022 issued in PCT Application PCT/JP2022/002128.
(Continued)

*Primary Examiner* — Matthew J. Reda
(74) *Attorney, Agent, or Firm* — NORTON ROSE FULBRIGHT US LLP

(57) ABSTRACT

A positioning processing unit measures the position of a work vehicle by a predetermined positioning method on the basis of a GNSS signal received from a satellite. A travel processing unit causes the work vehicle to travel automatically on the basis of position information of the work vehicle. A switching processing unit can switch between an RTK method and a DGPS method. A setting processing unit sets the work mode of the work vehicle to either a work accuracy preferential mode or a work continuity preferential mode. The switching processing unit switches between the RTK method and the DGPS method on the basis of the work mode and the positioning state.

12 Claims, 10 Drawing Sheets

(51) Int. Cl.
*G05D 1/646* (2024.01)
*G05D 107/20* (2024.01)

(58) Field of Classification Search
CPC .. G05D 1/81; G05D 2105/15; G05D 2107/21; G05D 2109/10
See application file for complete search history.

(56) References Cited

U.S. PATENT DOCUMENTS

| | | | | |
|---|---|---|---|---|
| 2009/0204281 | A1* | 8/2009 | McClure | A01B 69/001 701/25 |
| 2013/0135440 | A1* | 5/2013 | Ohtomo | G06T 7/33 348/46 |
| 2017/0168501 | A1* | 6/2017 | Ogura | G05D 1/0016 |
| 2017/0177002 | A1* | 6/2017 | Ogura | A01B 69/008 |
| 2017/0299728 | A1* | 10/2017 | Lie | G01S 19/43 |
| 2018/0215393 | A1* | 8/2018 | Miyakubo | G07C 5/0825 |
| 2019/0204092 | A1* | 7/2019 | Wheeler | G01C 21/165 |
| 2020/0293066 | A1* | 9/2020 | Shibata | B64U 10/17 |
| 2020/0359547 | A1* | 11/2020 | Sakaguchi | A01B 69/00 |
| 2021/0157334 | A1* | 5/2021 | Zhou | G05D 1/0278 |
| 2021/0278847 | A1* | 9/2021 | Prikhodko | G05D 1/027 |
| 2022/0066456 | A1* | 3/2022 | Ebrahimi Afrouzi | G06F 3/04883 |
| 2023/0258826 | A1* | 8/2023 | Kitano | G01S 19/49 701/408 |

FOREIGN PATENT DOCUMENTS

| | | | |
|---|---|---|---|
| JP | 2018004307 | A | 1/2018 |
| JP | 2020-135802 | A | 8/2020 |
| JP | 2020187669 | A | 11/2020 |
| WO | 2015/147111 | A1 | 10/2015 |

OTHER PUBLICATIONS

GNSS Guidance System Automatic Steering System General catalog, Pamphlet, Yanmar Agribusiness Co., Ltd; Issue Date: Apr. 2020; pp. 1-15; https://www.yanmar.com/media/news/2020/05/26054527/self_driving_guidance. pdf.
Trimble Smart Agriculture General Catalog 2019; Nikon-Trimble Co., Ltd.; pp. 1-14; https://www.nikon-trimble.co.jp/pdf/field/0501_agriculture/sougou_agriculture.pdf,.
Trimble GFX-750 Full Manual (Application Reference Manual); Nikon-Trimble Co., Ltd.; pp. 43-61; Publication Date: Mar. 2018; https://annex.nikon-trimble.co.jp/agri/user/pdf/setting/00.pdf.
Trimble GFX-750 Manual (Trimble GFX-750 Filed Task Setting); Nikon-Trimble Co., Ltd.; pp. 1-3; Publication Date: Jan. 4, 2021; https://annex.nikon-trimble.co.jp/agri/user/pdf/setting/05.pdf; p. 2.
Trimble GFX-750 Manual (Trimble GFX-750 Work Machine Setting); Nikon-Trimble Co., Ltd.; pp. 1-7; Publication Date: Jan. 4, 2021; https://annex.nikon-trimble.co.jp/agri/user/pdf/setting/04.pdf; p. 3.
Trimble GFX-750 Manual (Trimble GFX-750 Gnss Setting DGPS Edition); Nikon-Trimble Co., Ltd.; pp. 1-5; Publication Date: Jan. 4, 2021; https://annex.nikon-trimble.co.jp/agri/user/pdf/setting/22.pdf; p. 4.
1 Extended European Search Report dated Nov. 22, 2024 issued in EP Application No. 22755823.6.
Japanese Office Action dated Jul. 22, 2025 issued in JP Application No. 2024-080906.

* cited by examiner

AUTOMATIC TRAVEL METHOD, AUTOMATIC TRAVEL SYSTEM, AND AUTOMATIC TRAVEL PROGRAM

CROSS-REFERENCE TO RELATED APPLICATIONS

This application is a national stage application pursuant to 35 U.S.C. § 371 of International Application No. PCT/JP2022/002128, filed on Jan. 21, 2022, which claims priority under 35 U.S.C. § 119 to Japanese Patent Application No. 2021-022414 filed on Feb. 16, 2021, the disclosures of which are hereby incorporated by reference in their entireties.

TECHNICAL FIELD

The present invention relates to an automatic travel method, an automatic travel system, and an automatic travel program for causing a work vehicle to automatically travel.

BACKGROUND ART

A real-time kinematic method (RTK-GPS positioning method, hereinafter referred to as "RTK method") that enables highly accurate positioning of a work vehicle such as a tractor is known. The RTK method allows the work vehicle to automatically travel with high accuracy.

When an obstacle such as windbreak, building, etc. is present near a work vehicle, there may be a case where it is impossible to receive a radio signal from a satellite, or impossible to receive signals from the predetermined number of satellites due to a radio interference or the like, thereby causing a positioning failure. When the positioning failure is caused, the work vehicle stops automatic travel, so that a problem of deteriorated work efficiency occurs.

Conventionally, a system, which avoids stopping the work vehicle by causing the work vehicle to automatically travel with an inertial navigation when the aforementioned positioning failure occurs, has been proposed (see, Patent Literature 1, for example). This system can prevent the deterioration of work efficiency.

CITATION LIST

Patent Literature

Patent Literature 1: International Publication No. 2015/147111

DISCLOSURE OF INVENTION

Problems to be Solved by the Invention

However, the aforementioned conventional technology causes the work vehicle to uniformly continue the automatic travel with inertial navigation when the aforementioned positioning failure occurs, so that there is a problem that the work accuracy of the route automatically traveled with the inertial navigation is deteriorated. For example, in the case of work requiring high positional accuracy of the work vehicle (e.g., seeding work), deterioration in positional accuracy also results in deterioration in work accuracy. On the other hand, if the work vehicle is uniformly stopped when the aforementioned positioning failure occurs, there is a problem that work efficiency decrease.

An object of the present invention is to provide an automatic travel system, an automatic travel method, and an automatic travel program capable of preventing from decrease of work efficiency and deterioration of work accuracy of a work vehicle which can automatically travel.

Means for Solving the Problems

An automatic travel method according to the present invention is a method including: positioning a position of a work vehicle using a predetermined positioning method based on a satellite signal received from a satellite; causing the work vehicle to automatically travel based on position information indicating a position of the positioned work vehicle; switching mutually between a first positioning method and a second positioning method that has a lower positional accuracy of positioning than the first positioning method; setting a work mode of the work vehicle either to a first work mode to cause the work vehicle to stop automatic travel when a positioning state is degraded from a predetermined state, or to a second work mode to cause the work vehicle to continue automatic travel when the positioning state is degraded from the predetermined state; and switching between the first positioning method and the second positioning method based on the set work mode and the positioning state.

An automatic travel system according to the present invention includes a positioning processing unit, a travel processing unit, a switching processing unit, and a setting processing unit. The positioning processing unit positions a position of a work vehicle using a predetermined positioning method based on a satellite signal received from a satellite; The travel processing unit causes the work vehicle to automatically travel based on position information indicating a position of the work vehicle positioned by the positioning processing unit. The switching processing unit can switch mutually between a first positioning method and a second positioning method that has a lower positional accuracy of positioning than the first positioning method. The setting processing unit sets a work mode of the work vehicle either to a first work mode to cause the work vehicle to stop automatic travel when a positioning state in the positioning processing unit is degraded from a predetermined state, or to a second work mode to cause the work vehicle to continue automatic travel when the positioning state in the positioning processing unit is degraded from the predetermined state. The switching processing unit switches between the first positioning method and the second positioning method based on the work mode set by the setting processing unit and the positioning state in the positioning processing unit.

An automatic travel program according to the present invention is a program for causing one or more processors to execute the procedure including: positioning a position of a work vehicle using a predetermined positioning method based on a satellite signal received from a satellite; causing the work vehicle to automatically travel based on position information indicating a position of the positioned work vehicle; switching mutually between a first positioning method and a second positioning method that has a lower positional accuracy of positioning than the first positioning method; setting a work mode of the work vehicle either to a first work mode to cause the work vehicle to stop automatic travel when a positioning state is degraded from a predetermined state, or to a second work mode to cause the work vehicle to continue automatic travel when the positioning state is degraded from the predetermined state; and switching between the first positioning method and the second positioning method based on the set work mode and the positioning state.

Effect of the Invention

According to the present invention, it is possible to provide an automatic travel system, an automatic travel method, and an automatic travel program capable of preventing from decrease of work efficiency and deterioration of work accuracy of a work vehicle which can automatically travel.

DESCRIPTION OF EMBODIMENTS

Embodiments below are examples that embody the present invention and are not intended to limit the technical scope of the present invention.

Figure 1:
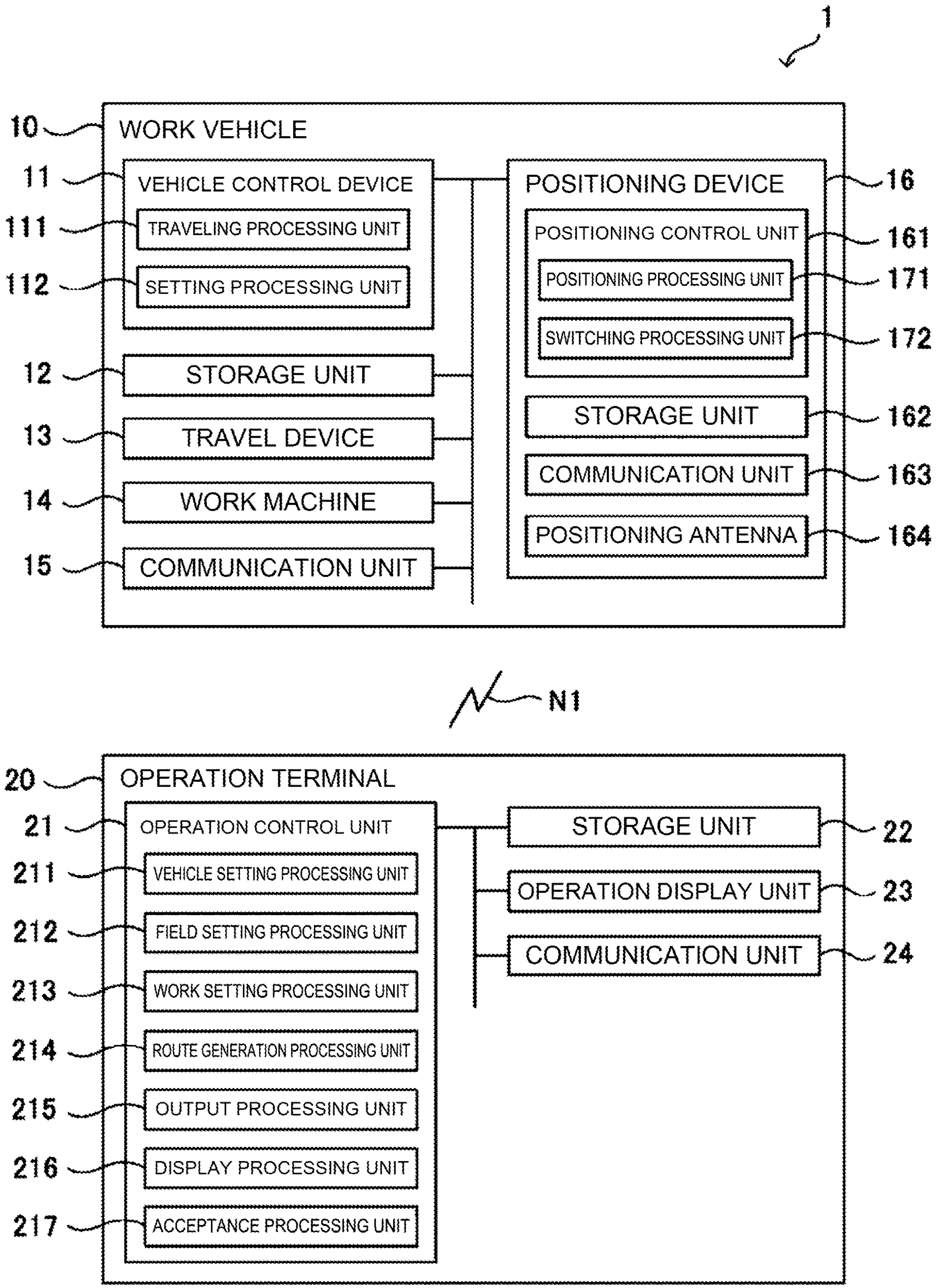
FIG. 1 is a block diagram illustrating a configuration of an automatic travel system according to an embodiment of the present invention.
Figure 2:
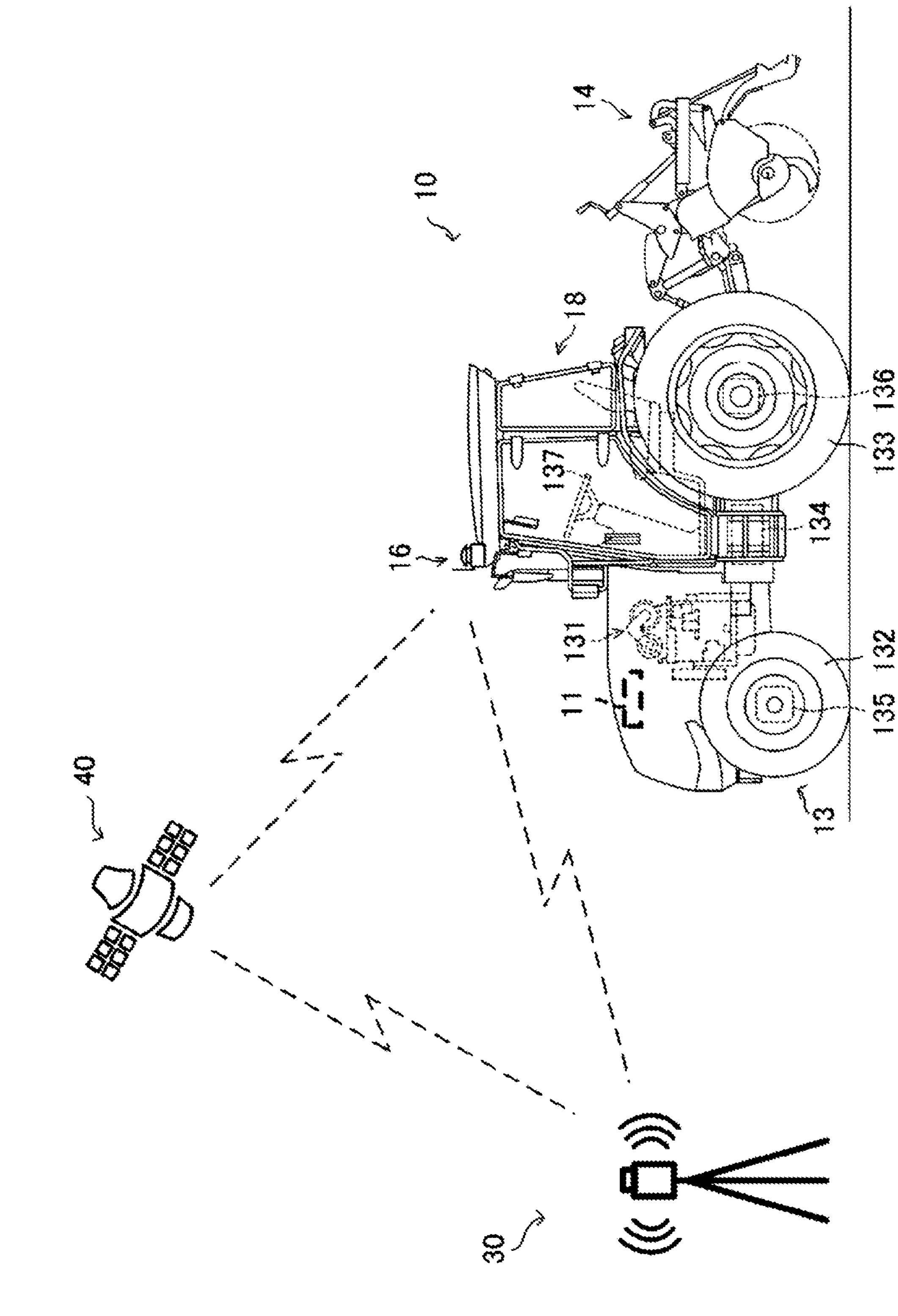
FIG. 2 is a schematic diagram illustrating an overall configuration of the automatic travel system according to the embodiment of the present invention.

As illustrated in FIGS. 1 and 2, an automatic travel system 1 according to an embodiment of the present invention includes a work vehicle 10, an operation terminal 20, a base station 30, and a satellite 40. The work vehicle 10 and the operation terminal 20 can communicate with each other via a communication network N1. For example, the work vehicle 10 and the operation terminal 20 can communicate with each other via a mobile phone line network, a packet line network, or a wireless LAN.

In the present embodiment, an example, in which the work vehicle 10 is a tractor, will be described. As another embodiment, the work vehicle 10 may be a rice transplanter, a combine harvester, a construction machine, a snowplow, or the like. The work vehicle 10 is a so-called robot tractor having a configuration that enables automatic traveling (autonomous traveling) along a preset travel route R (inner-field route R1 and outer-field route R2) in a field F (see FIG. 3). For example, the work vehicle 10 can automatically travel along the travel route R that is generated for the field F in advance on the basis of positional information about the current position of the work vehicle 10, which is positioned by a positioning device 16.

Figure 3:
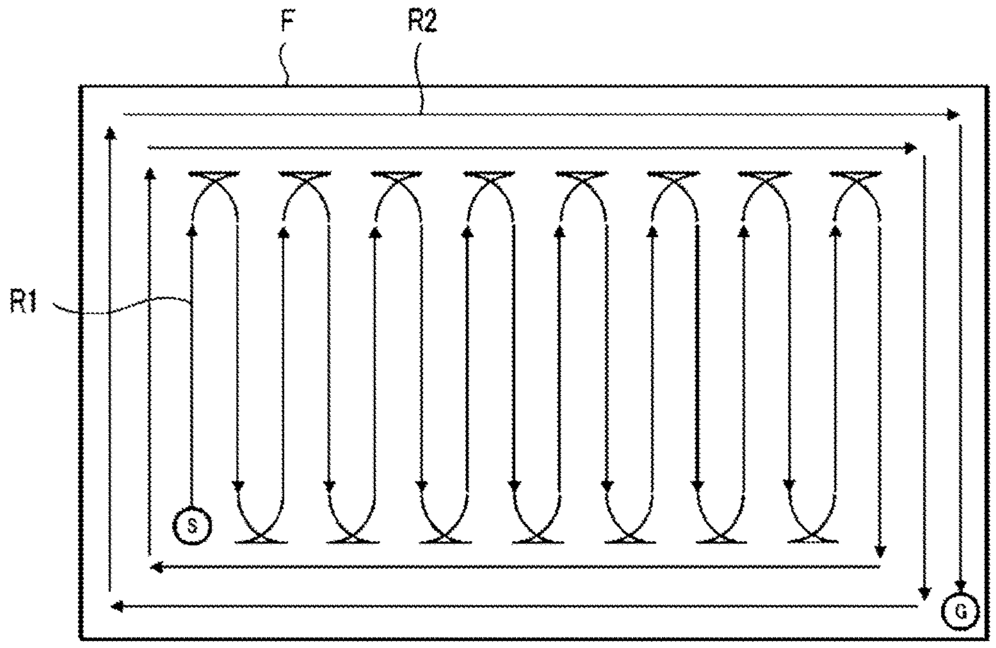
FIG. 3 is a diagram illustrating an example of a travel route of the work vehicle according to the embodiment of the present invention.

For example, in the work are in the field F shown in FIG. 3, the work vehicle 10 travels along the inner-field route R1 back and forth in a parallel manner from a work start position S, and travels along the outer-field route R2 in an inward spiral manner toward a work end position G. The travel route R is not limited to the route illustrated in FIG. 3, but can be set as appropriate in accordance with a work content.

The satellite 40 is a positioning satellite that configures a satellite positioning system such as GNSS (Global Navigation Satellite System), and transmits a GNSS signal (satellite signal). The base station 30 is a reference point (reference station) that configures the satellite positioning system. To the work vehicle 10, the base station 30 sends correction information for calculating the current position of the work vehicle 10.

Using the GNSS signal transmitted from the satellite 40, the positioning device 16 execute a positioning process that calculates the current position (latitude and longitude) of the work vehicle 10. Specifically, the positioning device 16 positions the work vehicle 10 by using a stand-alone positioning method which positions the work vehicle 10 based on the positioning information (GNSS signals, etc.) received by one receiver (positioning antenna 164), the RTK method which positions the work vehicle 10 based on the positioning information (GNSS signals, etc.) received by two receivers (positioning antenna 164 and base station 30) and correction information generated by the base station 30, and the DGPS (Differential Global Positioning System) method, etc. The above-mentioned positioning methods are well-known technologies, and detailed descriptions thereof are omitted.

In general, an error in positioning by the RTK method is a few centimeters, an error in positioning by the DGPS method is a few meters, and an error in positioning by stand-alone positioning method is about 10 meters. In other words, the DGPS method and the stand-alone positioning method are positioning methods with lower positional accuracy of positioning than the RTK method. The RTK method is an example of the first positioning method of the present invention, while the DGPS method and the stand-alone positioning method are examples of the second positioning method of the present invention. In the following, the RTK method is given as an example of the first positioning method of the present invention, and the DGPS method is given as an example of the second positioning method of the present invention.

Work Vehicle 10

As shown in FIGS. 1 and 2, the work vehicle 10 has a vehicle control device 11, a storage unit 12, a travel device 13, a work machine 14, a communication unit 15, a positioning device 16, and the like. The vehicle control device 11 is electrically connected to the storage unit 12, the travel device 13, the work machine 14, the positioning device 16, and the like. The vehicle control device 11 and the positioning device 16 may be capable of performing wireless communication.

The communication unit 15 is a communication interface that connects the work vehicle 10 to the communication network N1 by wire or wirelessly, thereby to perform a data communication according to a predetermined communication protocol with external devices such as the operation terminal 20 via the communication network N1.

The storage unit 12 is a non-volatile storage unit such as a hard disk drive (HDD) or a solid state drive (SSD) that stores various pieces of information. The storage unit 12 stores control programs such as an automatic travel program for causing the vehicle control device 11 to execute an automatic travel process described below (see FIG. 8). For example, the automatic travel program is non-transitorily recorded in a computer-readable recording medium such as a CD or a DVD, and is read out by a predetermined reading device (not illustrated) to be stored in the storage unit 12. The automatic travel program may be downloaded from a server (not illustrated) to the work vehicle 10 via the communication network N1 to be stored in the storage unit 12. Furthermore, in the storage unit 12, the data of the travel route R which is generated in the operation terminal 20 is stored.

The travel device 13 is a driving unit that causes the work vehicle 10 to travel. As illustrated in FIG. 2, the travel device 13 includes an engine 131, front wheels 132, rear wheels 133, a transmission 134, a front axle 135, a rear axle 136, a steering wheel 137, and the like. Note that the front wheels 132 and the rear wheels 133 are respectively provided at right and left of the work vehicle 10. Furthermore, the travel device 13 is not limited to be of the wheel type including the front wheels 132 and the rear wheels 133 but may also be of a crawler type including crawlers provided on each side of the work vehicle 10.

The engine 131 is a driving source such as a diesel engine and a gasoline engine that are driven using fuel supplied in a fuel tank (not shown). The travel device 13 may include an electric motor as the driving source together with the engine 131 or in place of the engine 131. Note that a power generator (not shown) is connected to the engine 131, and electric power is supplied from the power generator to an electric component such as the vehicle control device 11, a battery, and the like, which are provided in the work vehicle 10. Note that the battery is charged with the electric power supplied from the power generator. Then, the electric components such as the vehicle control device 11 and the positioning device 16 which are provided on the work vehicle 10 can be driven by the electric power supplied from the battery even after the engine 131 is stopped.

Driving force of the engine 131 is transmitted to the front wheels 132 via the transmission 134 and the front axle 135, and is transmitted to the rear wheels 133 via the transmission 134 and the rear axle 136. The driving force of the engine 131 is also transmitted via a PTO shaft (not shown) to the work machine 14. When the work vehicle 10 performs automatic travel, the travel device 13 performs travel operation according to an instruction from the vehicle control device 11.

For example, the work machine 14 is a cultivator, a sowing machine, a mower, a plow, a fertilizer, etc. and detachable to/from the work vehicle 10. Thus, the work vehicle 10 can perform various types of works by using each work machine 14. FIG. 2 shows a case where the work machine 14 is a cultivator.

The steering wheel 137 is an operating unit operated by an operator or the vehicle control device 11. For example, in the travel device 13, the angle of the front wheels 132 is changed by a hydraulic power steering mechanism (not illustrated) or the like in accordance with the operation of the steering wheel 137 by the vehicle control device 11, thereby to change an advancing direction of the work vehicle 10.

Furthermore, the travel device 13 includes a shift lever, an accelerator, a brake, and the like (not illustrated) operated by the vehicle control device 11, in addition to the steering wheel 137. Then, in the travel device 13, a gear of the transmission 134 is switched to a forward gear, a backward gear or the like in response to operation of the shift lever by the vehicle control device 11, and a traveling mode of the work vehicle 10 is switched to be forward, backward or the like. Furthermore, the vehicle control device 11 operates the accelerator, thereby to control the revolution speed of the engine 131. Furthermore, the vehicle control device 11 operates the brakes to stop the rotation of the front wheels 132 and the rear wheels 133 using an electromagnetic brake.

The positioning device 16 is a communication device that includes a positioning control unit 161, a storage unit 162, a communication unit 163, a positioning antenna 164, and the like. For example, as shown in FIG. 2, the positioning device 16 is provided on the top of a cabin 18 in which the operator gets. An installation position of the positioning device 16 is not limited to the cabin 18. Furthermore, the positioning control unit 161, the storage unit 162, the communication unit 163, and the positioning antenna 164 of the positioning device 16 may be dispersedly located at different positions in the work vehicle 10. Note that, as described above, the battery is connected to the positioning device 16, so that the positioning device 16 can operate when the engine 131 is stopped. Furthermore, as the positioning device 16, a mobile phone terminal, a smart phone, a tablet terminal, or the like, for example, may be substituted.

The communication unit 163 is a communication interface for connecting the positioning device 16 to the communication network N1 by wire or wirelessly and for performing data communication according to a predetermined communication protocol with external devices such as the base station 30 via the communication network N1.

The positioning antenna 164 is an antenna to receive a radio wave (a GNSS signal) transmitted from a satellite.

The positioning control unit 161 is a computer system that includes one or more processors and memories such as a nonvolatile memory, an RAM, and the like. The storage unit 162 is a non-volatile memory or the like that stores an automatic travel program for causing the positioning control unit 161 to execute a positioning process, and data such as positioning information and movement information. For example, the automatic travel program is non-transitorily recorded in a computer-readable recording medium such as a CD or a DVD, and is read out by a predetermined reading device (not illustrated) to be stored in the storage unit 162. Furthermore, the automatic travel program may be downloaded from a server (not illustrated) to the positioning device 16 via the communication network N1 to be stored in the storage unit 162.

The positioning control unit 161 includes various processing units such as a positioning processing unit 171 and a switching processing unit 172. The positioning control unit 161 executes various processes according to the automatic travel program, thereby to function as the various processing units. Furthermore, as another embodiment, some or all of the positioning processing unit 171 and switching processing unit 172 may consist of electronic circuits.

The positioning processing unit 171 positions the work vehicle 10's position by a predetermined positioning method (RTK method, DGPS method, etc.) based on the GNSS signal (an example of the satellite signal of the present invention) received by the positioning antenna 164 from the satellite 40. Specifically, the positioning processing unit 171 positions the work vehicle 10 by the DGPS method when the positioning method is set to the DGPS method, and positions the work vehicle 10 by the RTK method when the positioning method is set to the RTK method. The positioning processing unit 171 is an example of a positioning processing unit of the present invention.

The switching processing unit 172 mutually switches between the method DGPS and the RTK method. Specifically, the switching processing unit 172 switches between the RTK method and the DGPS method based on the work mode (described later) of the work vehicle 10, which is set by the setting processing unit 112 and the positioning state in the positioning processing unit 171. The switching processing unit 172 is an example of a switching processing unit of the present invention. The positioning state indicates the reception status of GNSS signals transmitted from the satellites 40 at the positioning device 16. For example, the greater the number of satellites 40 that can receive the GNSS signals is, the better (higher accuracy) the positioning state is. For example, if the number of satellites 40 that can receive the GNSS signals decreases due to the presence of obstacles such as windbreaks, buildings, etc. near the field F, the positioning state is degraded. The positioning state is represented, for example, as an evaluation value of quality of the GNSS signals (GNSS Quality).

Here, the positioning method may be preset to the RTK method. That is, the default of the positioning method may be set to the RTK method. In this case, when the engine 131 of the work vehicle 10 is started up, the positioning processing unit 171 starts receiving the GNSS signals transmitted from the satellite 40, and continues executing the positioning process until the positioning state reaches a high accuracy state ready for RTK positioning. For example, when the positioning state reaches the high accuracy state, the positioning processing unit 171 transmits a notification of high accuracy positioning completion to the vehicle control device 11 and the operation terminal 20. The vehicle control device 11 permits automatic travel using the RTK method when the positioning state reaches a state of high accuracy positioning completion. In other words, the travel processing unit 111 of the vehicle control device 11 starts automatic travel of the work vehicle 10 using the RTK method, provided that the positioning state is a high accuracy state ready for RTK positioning.

Figure 4:
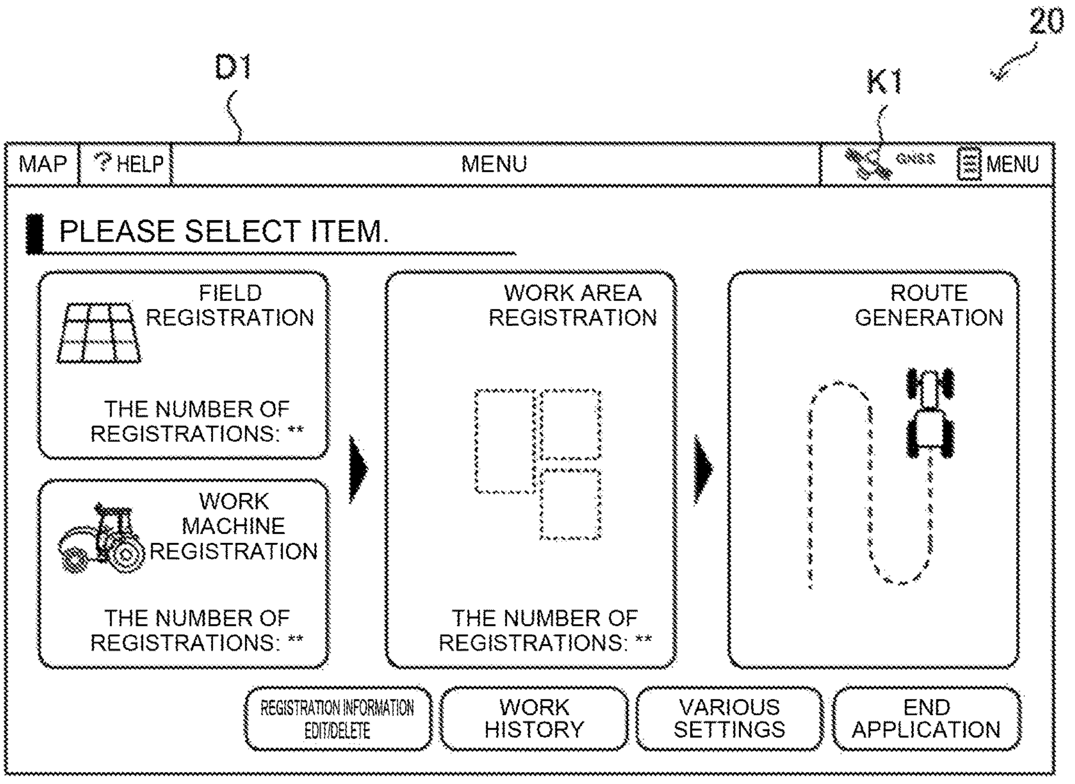
FIG. 4 is a diagram illustrating an example of a menu screen displayed on an operation terminal according to the embodiment of the present invention.
Figure 5:
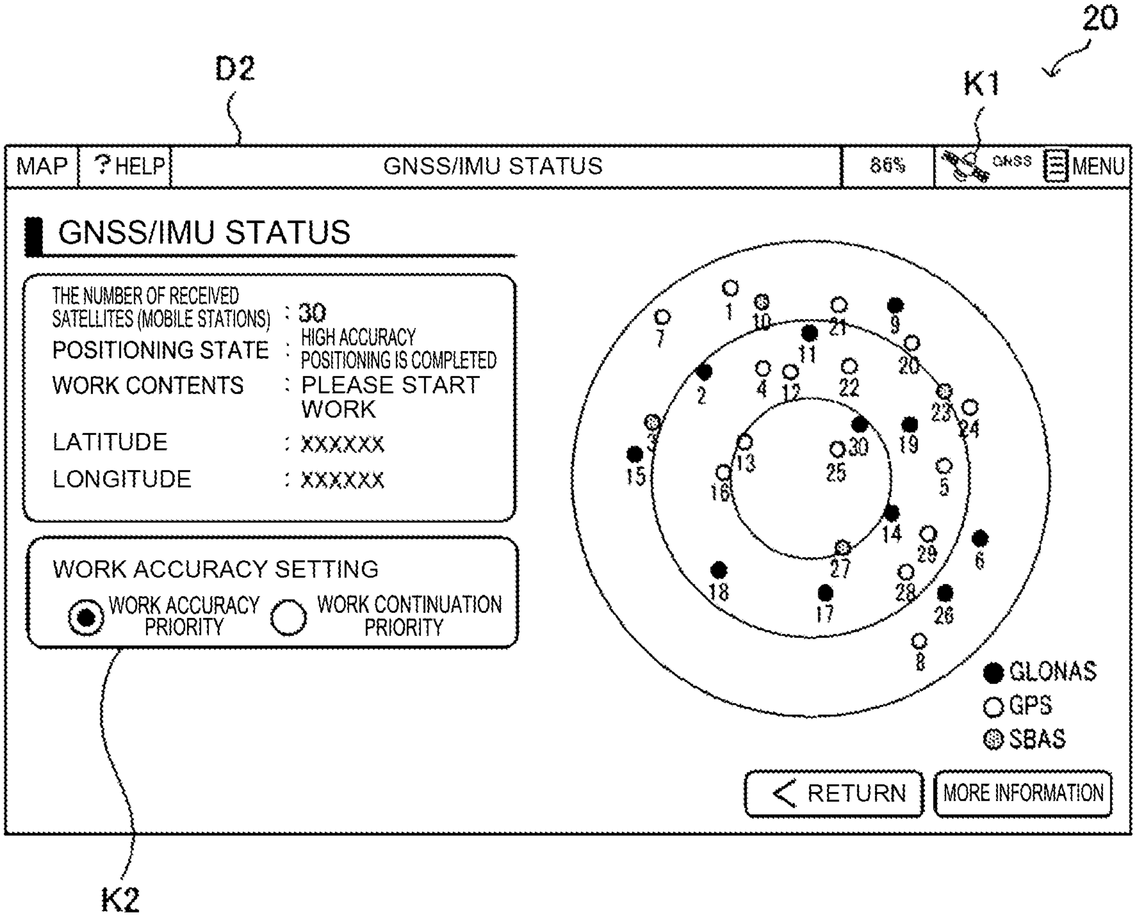
FIG. 5 is a diagram illustrating an example of a status screen displayed on the operation terminal according to the embodiment of the present invention.

For example, the operator starts the engine 131 of the work vehicle 10 and turns on power of the operation terminal 20, and the menu screen D1 shown in FIG. 4 is displayed on the operation terminal 20. The menu screen D1 displays various setting items such as field registration, work machine registration, work area registration, and route generation, and the like, as well as an icon K1 (an example of an image of the present invention) representing the positioning state. When the operator presses down the icon K1, the status screen D2 shown in FIG. 5 is displayed on the operation terminal 20. The status screen D2 displays the currently captured satellites 40, the number of satellites 40, the positioning state, etc. When the positioning state reaches a high accuracy state ready for RTK positioning, a message indicating high accuracy positioning completion is displayed on the status screen D2. The status screen D2 displays a work mode selection field K2 for selecting work accuracy settings (an example of the work mode of the present invention) described later.

The vehicle control device 11 includes control devices such as a CPU, a ROM, a RAM, and the like. The CPU is a processor that executes various arithmetic processes. The ROM is a non-volatile storage unit that previously stores control programs, such as BIOS and OS, to cause the CPU to execute various arithmetic processes. The RAM is a volatile or non-volatile storage unit that stores various pieces of information and is used as a transient storage memory (work area) for various processes executed by the CPU. The vehicle control device 11 causes the CPU to execute various types of control programs previously stored in the ROM or the storage unit 12 to control the work vehicle 10.

As shown in FIG. 1, the vehicle control device 11 includes various types of processing units such as the travel processing unit 111 and the setting processing unit 112. The vehicle control device 11 causes the CPU to execute various processes in accordance with the automatic travel program to function as the various processing units. Furthermore, some or all of the processing units may consist of electronic circuits. The automatic travel program may be a program for causing a plurality of processors to function as the processing units.

Figure 6A:
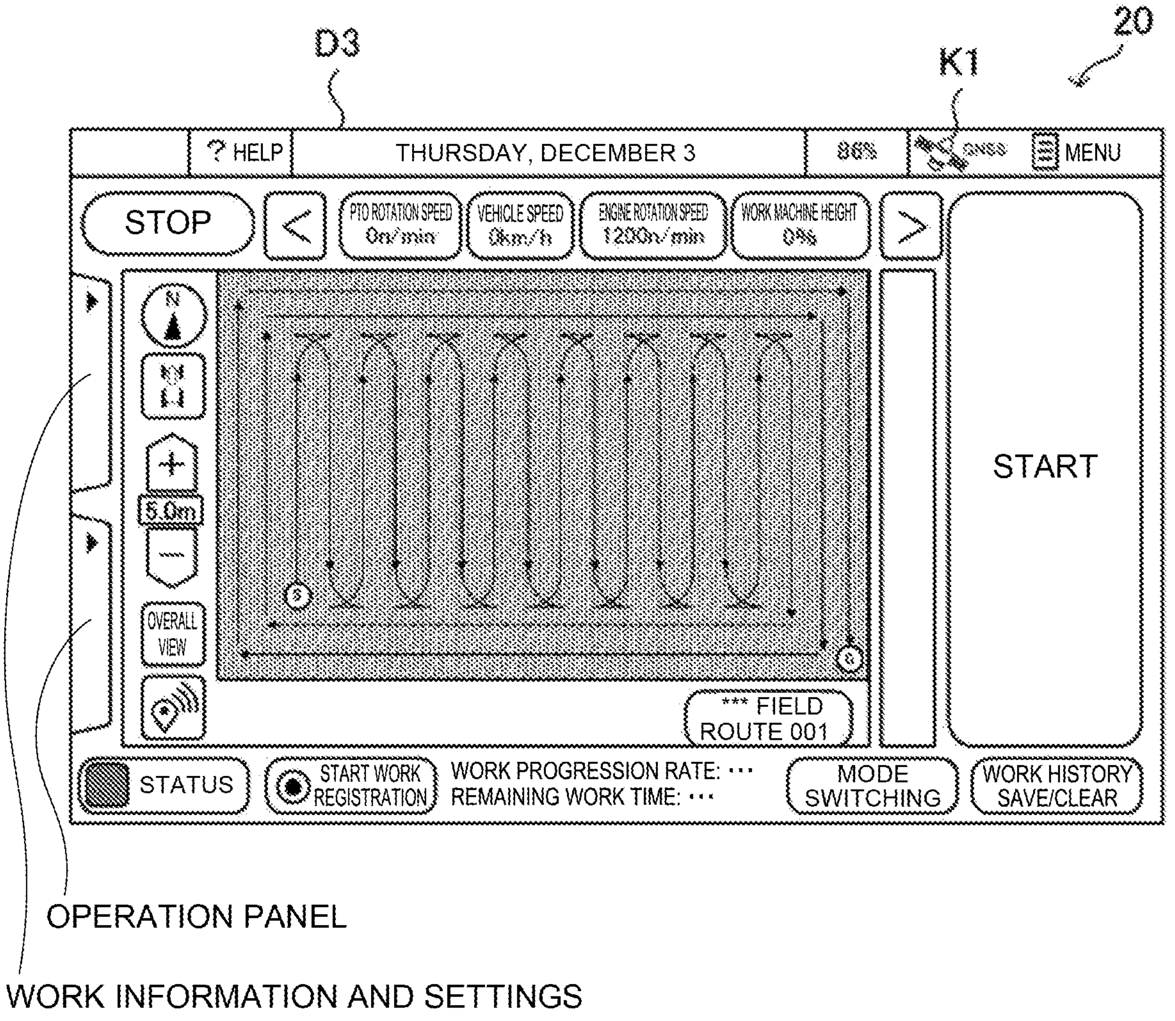
FIG. 6A is a diagram illustrating an example of an operation screen displayed on an operation terminal according to the embodiment of the present invention.

The travel processing unit 111 controls travel of the work vehicle 10. Specifically, the travel processing unit 111 causes the work vehicle 10 to perform the automatic travel based on the position information showing the work vehicle 10's position positioned by the positioning processing unit 171. For example, if the positioning state reaches ready for RTK positioning (high accuracy positioning completion) and the operator presses down the start button on an operation screen D3 (see FIG. 6A) of the operation terminal 20, the operation terminal 20 outputs a work start instruction to the work vehicle 10. Upon obtaining the work start instruction from the operation terminal 20, the travel processing unit 111 of the work vehicle 10 starts the automatic travel of the work vehicle 10 on the basis of the position information indicating the position of the work vehicle 10, which is positioned by the positioning processing unit 171. This causes the work vehicle 10 to start automatic travel along the travel route R and start work with the work machine 14. The travel route R along which the work vehicle 10 travels is generated, for example, by the operation terminal 20. The work vehicle 10 acquires the travel route R from the operation terminal 20 and automatically travels in the field F along the travel route R.

Figure 6B:
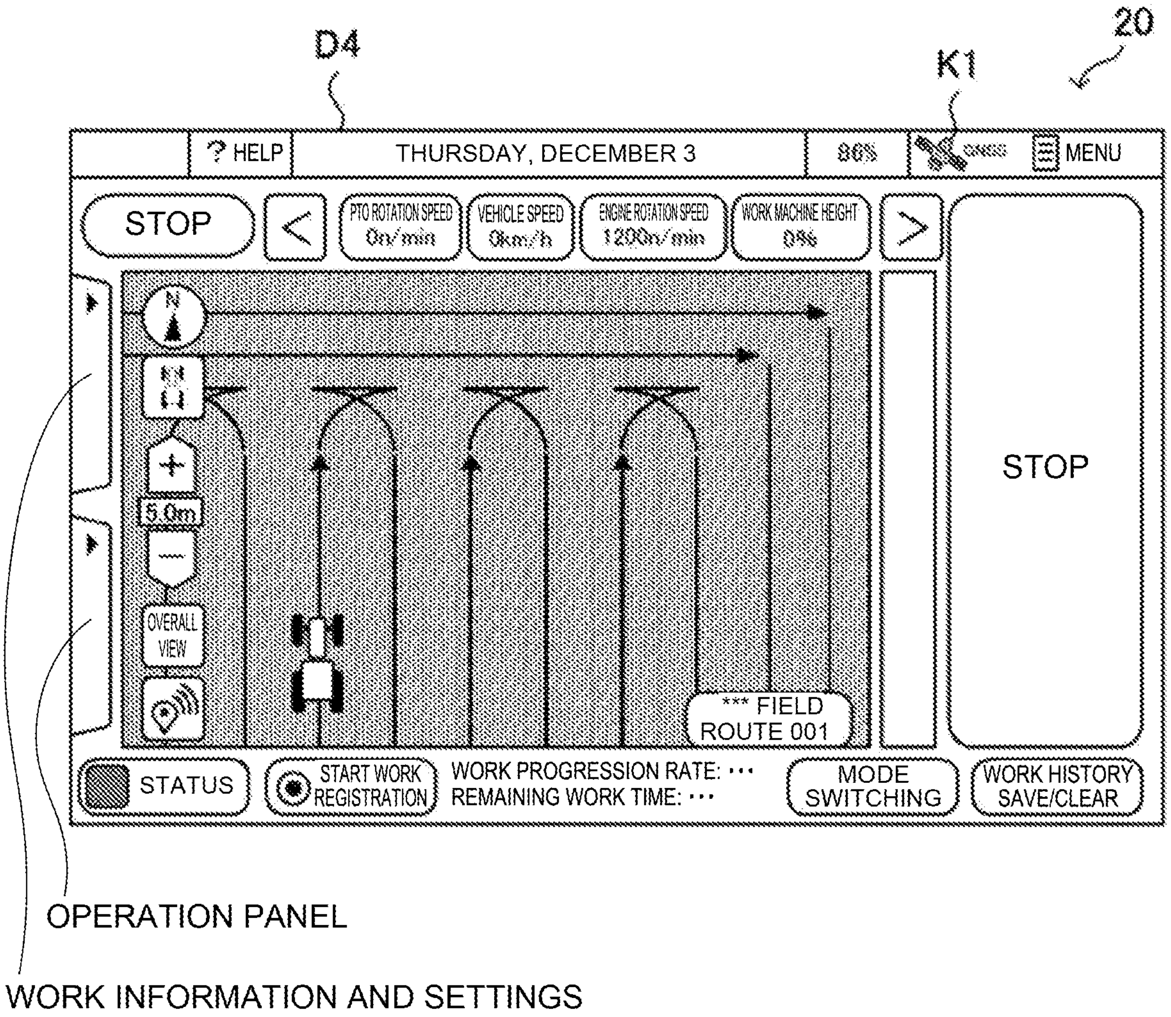
FIG. 6B is a diagram illustrating an example of the operation screen displayed on the operation terminal according to the embodiment of the present invention.

Furthermore, upon acquiring a travel stop instruction from the operation terminal 20, the travel processing unit 111 stops the automatic travel of the work vehicle 10. For example, if the operator presses down the stop button on the operation screen D4 (see FIG. 6B) of the operation terminal 20, the operation terminal 20 outputs the travel stop instruction to the work vehicle 10. Upon obtaining the travel stop instruction from the operation terminal 20, the travel processing unit 111 causes the work vehicle 10 to stop the automatic travel. Accordingly, the work vehicle 10 stops the automatic travel and stops the work with the work machine 14. The travel processing unit 111 is an example of a travel processing unit of the present invention.

The setting processing unit 112 sets the work mode of the work vehicle 10. Specifically, the setting processing unit 112 sets the work mode of the work vehicle 10 either to a work accuracy priority (an example of the first work mode of the present invention) to stop automatic travel of the work vehicle 10 when the positioning state in the positioning processing unit 171 is degraded from the predetermined state, or to a work continuation priority (an example of the second work mode of the present invention) to continue automatic travel of the work vehicle 10 when the positioning state in the positioning processing unit 171 is degraded from the predetermined state. The predetermined state indicates a high accuracy state ready for RTK positioning, for example. The setting processing unit 112 is an example of the setting processing unit of the present invention.

For example, the setting processing unit 112 sets the work mode on the basis of the operator's selection operation to select either the work accuracy priority or the work continuation priority. Specifically, when starting work with the work vehicle 10, the operator selects either the work accuracy priority or the work continuation priority in the work mode selection field K2 of the "WORK ACCURACY SETTING" displayed on the status screen D2 shown in FIG. 5. For example, in a case where desiring to stop temporarily automatic travel to prevent work accuracy from being deteriorated (to prioritize work accuracy) as the positioning state is degraded, the operator selects "WORK ACCURACY PRIORITY". In contrast, for example, in a case where desiring to continue automatic travel to prevent work efficiency from being decreased (to prioritize work efficiency) as the positioning state is degraded, the operator selects "WORK CONTINUATION PRIORITY". The work mode default may be set to "WORK ACCURACY PRIORITY". In this case, when desiring to switch the work mode to "WORK CONTINUATION PRIORITY", the operator switches the work mode by displaying the status screen D2.

The travel processing unit 111 causes the work vehicle 10 to automatically travel according to the work mode. Specifically, when the work mode is set to the work accuracy priority, the travel processing unit 111 causes the work vehicle 10 to automatically travel on the basis of the position information by the RTK method if the positioning state is the high accuracy state, and the travel processing unit 111 causes the work vehicle 10 to stop (temporarily stop) automatic travel if the positioning state is degraded from the high accuracy state. For example, when the positioning method is set to the RTK method and the work mode is set to work accuracy priority, since the positioning accuracy is deteriorated if the positioning state is degraded due to influence of obstacles while the work vehicle 10 is automatically traveling, the travel processing unit 111 causes the work vehicle 10 to stop temporarily. After the work vehicle 10 is temporarily stopped, when the positioning state is recovered and the work vehicle 10 reaches the high accuracy state (high accuracy positioning complete), the travel processing unit 111 causes the work vehicle 10 to resume automatic travel. This prevents the work accuracy of the work vehicle 10 from being deteriorated.

In contrast, when the work mode is set to the work continuation priority, if the positioning state is the high accuracy state, the travel processing unit 111 causes the work vehicle 10 to travel automatically on the basis of the position information by the RTK method, and if the positioning state is degraded from the high accuracy state, the travel processing unit 111 causes the work vehicle 10 to travel automatically on the basis of the position information by a DGPS method. For example, when the positioning method is set to the RTK method and the work mode is set to the work continuation priority, if the positioning state is degraded due to influence of obstacles while the work vehicle 10 is traveling automatically, the switching processing unit 172 switches the positioning method from the RTK method to the DGPS method. In this way, the travel processing unit 111 causes the work vehicle 10 to travel automatically using positioning by the RTK method when the positioning state is the high accuracy state, and causes the work vehicle 10 to continue automatic travel using positioning by the DGPS method when the positioning state is degraded. This prevents the work accuracy of the work vehicle 10 from being deteriorated.

When the positioning method is switched from the RTK method to the DGPS method, the travel processing unit 111 may perform automatic travel using the DGPS method by a predetermined time period (e.g., 60 seconds). If the positioning state recovers to a high accuracy state after the predetermined time period elapses, the switching processing unit 172 may switch the positioning method from the DGPS method to the RTK method. This allows the areas where work accuracy is deteriorated to be reduced. Further, the predetermined time period may be set according to the history of the positioning state. For example, if it is possible to identify a location in the field F, in which the positioning status is degraded, from information about the traveling history in the past work, the predetermined time period can be set by calculating the time required to pass through the location.

Operation Terminal 20

As shown in FIG. 1, the operation terminal 20 is an information processing device that includes an operation control unit 21, a storage unit 22, an operation display unit 23, a communication unit 24, and the like. The operation terminal 20 may include a portable terminal such as a tablet terminal or a smartphone.

The communication unit 24 is a communication interface that connects the operation terminal 20 to the communication network N1 by wire or wirelessly and performs data communications with one or more external devices, such as the work vehicles 10, via the communication network N1 in accordance with a predetermined communication protocol.

The operation display unit 23 is a user interface including a display unit, such as a liquid crystal display or an organic EL display, which displays various pieces of information, and an operating unit, such as a touch panel, a mouse, or a keyboard, which accepts operations. On an operation screen displayed on the display unit, the operator may operate the operating unit to register various pieces of information (such as work vehicle information, field information, and work information described later). Furthermore, the operator can operate the operating unit to issue a work start command, a travel stop command, and the like to the work vehicle 10. Furthermore, at a location away from the work vehicle 10, the operator can comprehend a travel status of the work vehicle 10, which travels automatically along the travel route R in the field F, from a travel trajectory that is displayed on the operation terminal 20.

The storage unit 22 is a non-volatile storage unit such as an HDD or an SSD that stores various pieces of information. The storage unit 22 stores a control program such as an automatic travel program for causing the operation control unit 21 to execute the automatic travel process (see FIG. 8) described later. For example, the automatic travel program is non-transiently recorded in a computer-readable recording medium such as a CD and a DVD, read out by a predetermined reading device (not illustrated), and stored in the storage unit 22. Note that the automatic travel program may be downloaded from a server (not shown) via the communication network N1 to the operation terminal 20 thereby to be stored in the storage unit 22.

The operation control unit 21 has control devices such as a CPU, a ROM, and a RAM. The CPU is a processor that executes various arithmetic processes. The ROM is a non-volatile storage unit that stores in advance control programs, such as BIOS and OS, to cause the CPU to execute various arithmetic processes. The RAM is a volatile or non-volatile storage unit that stores various pieces of information and is used as a transient storage memory (work area) for various processes executed by the CPU. Then, the operation control unit 21 causes the CPU to perform various control programs, which are in advance stored in the ROM or the storage unit 22, thereby to control the operation terminal 20.

As shown in FIG. 1, the operation control unit 21 includes various processing units, such as a vehicle setting processing unit 211, a field setting processing unit 212, a work setting processing unit 213, a route generation processing unit 214, an output processing unit 215, a display processing unit 216, and an acceptance processing unit 217. The operation control unit 21 causes the CPU to execute various processes in accordance with the control programs to function as the various processing units. Furthermore, some or all of the processing units may consist of electronic circuits. The control programs may be programs for causing a plurality of processing units to function as the processing units. The vehicle setting processing unit 211 sets information on the work vehicle 10 (hereinafter referred to as "work vehicle information"). By the operator performing a registration operation of the information on the operation terminal 20, the vehicle setting processing unit 211 sets information about the model of the work vehicle 10, the position where the positioning antenna 164 is mounted on the work vehicle 10, the type of the work machine 14, the size and shape of work machine 14, the position of the work machine 14 with respect to the work vehicle 10, the vehicle speed and engine speed of the work vehicle 10 during work, the vehicle speed and engine speed of the work vehicle 10 during turning, and the like.

For example, the operator starts the engine 131 of the work vehicle 10 and turns on power of the operation terminal 20, whereby the display processing unit 216 causes the operation display unit 23 to display the menu screen D1 shown in FIG. 4. The operator selects "WORK MACHINE REGISTRATION" to register work machine information.

The field setting processing unit 212 sets information associated with the field F (hereinafter, referred to as "field information"). By the operator performing registration operation on the operation terminal 20, the field setting processing unit 212 sets information associated with the position and the shape of the field F, the work start position S to start work, the work end position G to finish work (see FIG. 3), and the work direction, and the like. For example, the operator selects "REGISTER FIELD" on the menu screen D1 to register field information.

The work direction means a direction in which the work vehicle 10 travels while causing the work machine 14 to work in a work area, which is an area excluding non-work areas such as a headland, a non-cultivated land, etc. from the field F.

The information associated with the position and the shape of the farm field F can be acquired automatically, for example, by the operator, who gets in the work vehicle 10, driving around an outer periphery of the field F once, and recording a transition of the position information of the positioning antenna 164 at that time. Furthermore, the position and the shape of the field F can be also acquired, based on a polygon obtained by the operator operating the operation terminal 20 with a map being displayed on the operation terminal 20 and designating a plurality of points on the map. An area specified by the acquired position and the shape of the field F is an area (travel area) in which the work vehicle 10 can travel.

The work setting processing unit 213 sets information about how work is to be performed specifically (hereinafter, referred to as "work information"). The work setting processing unit 213 is configured to be able to set, as the work information, presence or absence of cooperative work between the work vehicle 10 (unmanned tractor) and the manned work vehicle 10, the skip number, which is the number of work routes skipped when the work vehicle 10 turns in the headland, the width of the headland, the width of the non-cultivated land, and the like. For example, the operator selects "WORK AREA REGISTRATION" on the menu screen D1 to register work information.

The route generation processing unit 214 generates the travel route R, which is a route for causing the work vehicle 10 to automatically travel, on the basis of the set information. The travel route R is, for example, a work route from the work start position S to the work end position G (see FIG. 3). The travel route R shown in FIG. 3 includes an inner-field route R1, in which the work vehicle 10 travels in parallel back and forth in an inner area within the field F, and an outer-field route R2, in which the work vehicle 10 travels in an inward spiral manner in an outer area within the field F. The route generation processing unit 214 can generate and store the travel route R for the work vehicle 10 on the basis of the set information set in each of the vehicle setting processing unit 211, the field setting processing unit 212, and the work setting processing unit 213. For example, the operator selects "ROUTE GENERATION" on the menu screen D1 to generate the travel route R.

The route generation processing unit 214 generates the travel route R (see FIG. 3) on the basis of the work start position S and the work end position G registered in the field setting. The travel route R is not limited to the route illustrated in FIG. 3.

The data of the travel route R generated at the operation terminal 20 is transmitted to the work vehicle 10 and stored in the storage unit 12. While positioning the current position of the work vehicle 10 with the positioning device 16, the work vehicle 10 performs automatic travel along the travel route R. The current position of the work vehicle 10 usually coincides with the position of the positioning antenna 164.

The work vehicle 10 according to the present embodiment travels in a substantially rectangular field F as shown in FIG. 3. The work vehicle 10 is configured to be able to travel automatically when the current position thereof is located in the field F, and it is configured to be not able to travel automatically when the current position thereof is located outside the field F (e.g., on a public road or the like). The work vehicle 10 is configured to be able to travel automatically, for example, when the current position coincides with the work start position S.

In a case where the current position of the work vehicle 10 coincides with the work start position S, when the operator presses the start button on the operation screen D3 (see FIG. 6A) to issue the work start command, the travel processing unit 111 causes the work vehicle 10 to start automatic travel and causes the work machine 14 (see FIG. 2) to start work (e.g., cultivating work). That is, the work vehicle 10 permits the automatic travel on the condition that the current position thereof coincides with the work start position S. The condition for permitting the automatic travel of the work vehicle 10 is not limited to the above condition.

The output processing unit 215 outputs information on the travel route R, which is generated by the route generation processing unit 214, to the work vehicle 10. In addition, the output processing unit 215 can issue an instruction to the work vehicle 10 to start or stop the automatic travel by transmitting a control signal to the work vehicle 10 via the communication unit 24. This allows the work vehicle 10 to travel automatically.

For example, the travel processing unit 111 causes the work vehicle 10 to automatically travel from the work start position S to the work end position G on the basis of the travel route R acquired from the operation terminal 20. When the work vehicle 10 finishes work, the travel processing unit 111 may cause the work vehicle 10 to automatically travel from the work end position G to an entrance of the field F. When the work vehicle 10 is automatically traveling, the operation control unit 21 can receive the state of the work vehicle 10 (such as the position, the travel speed, etc.) from the work vehicle 10 and display the received state on the operation display unit 23 (see FIG. 6B).

Figure 7A:
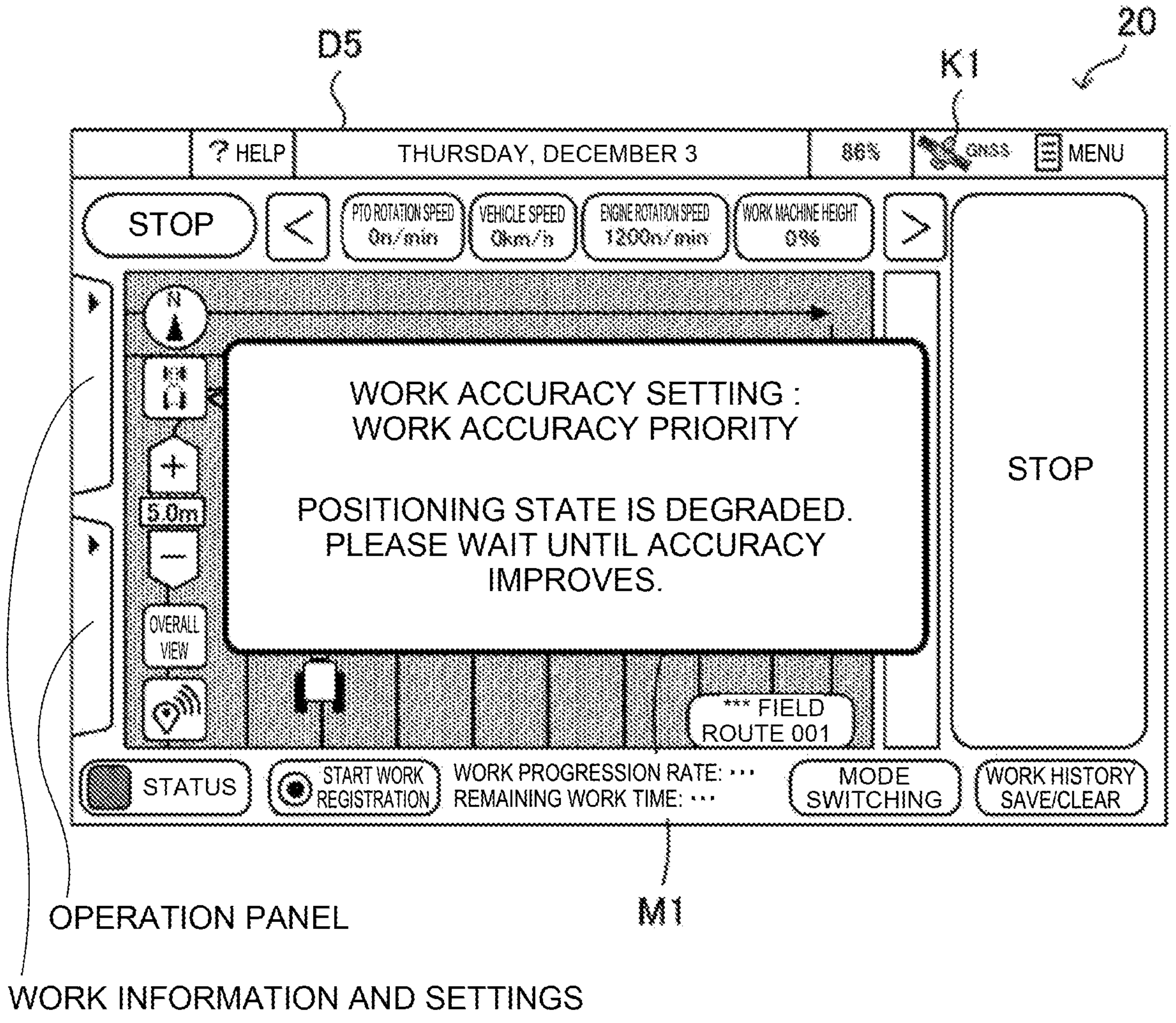
FIG. 7A is a diagram illustrating an example of a notification screen displayed on the operation terminal according to the embodiment of the present invention.
Figure 7B:
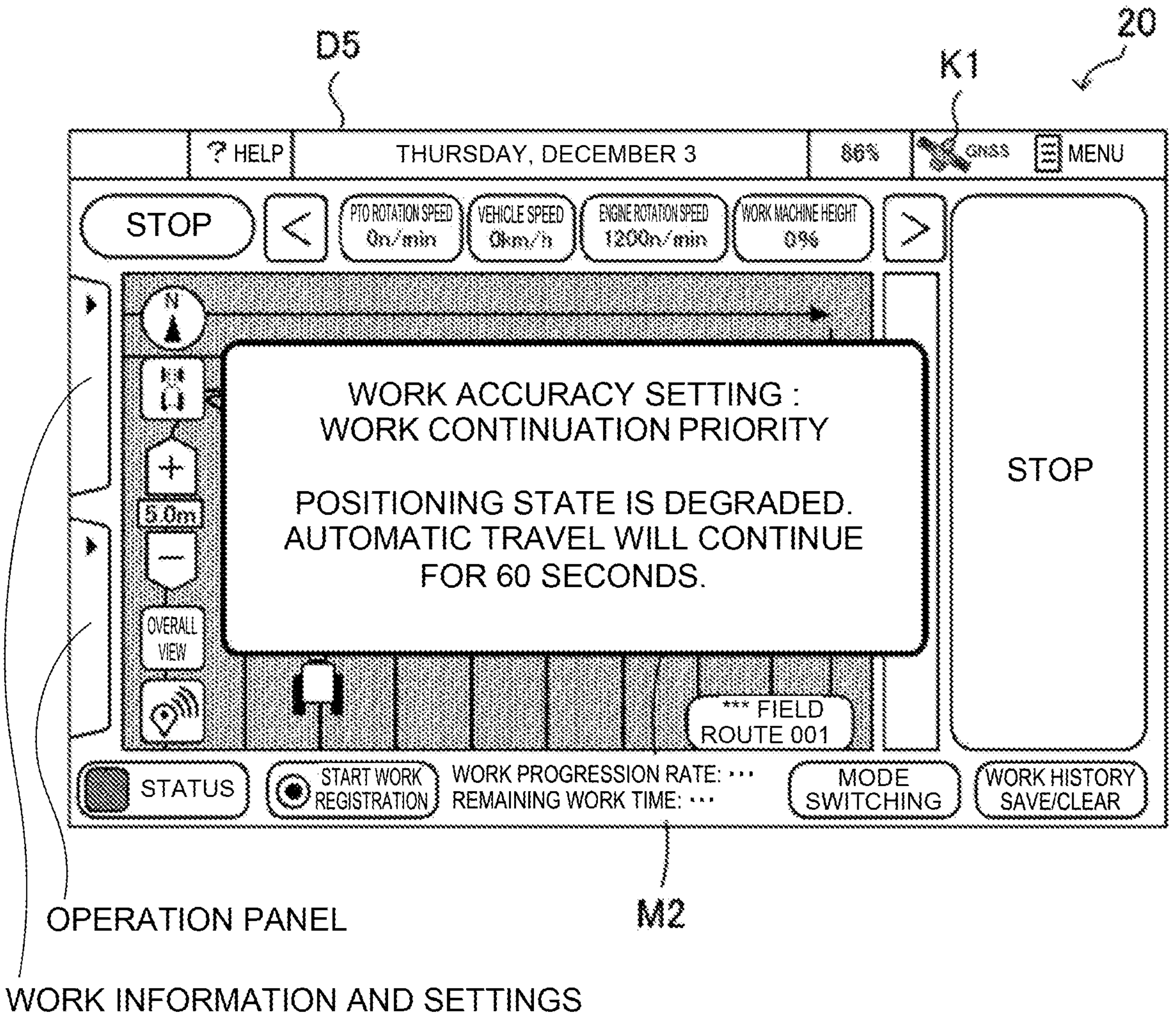
FIG. 7B is a diagram illustrating an example of the notification screen displayed on the operation terminal according to the embodiment of the present invention.

The display processing unit 216 causes the operation display unit 23 to display the various pieces of information. For example, the display processing unit 216 causes the operation display unit 23 to display a menu screen D1 (see FIG. 4), a registration screen (not shown) for registering work vehicle information, field information, work information, etc., a status screen D2 (see FIG. 5) showing the positioning state, an operation screen D3 (see FIG. 6A) to start automatic travel, an operation screen D4 (see FIG. 6B) showing a traveling state of automatic travel, a notification screen D5 (see FIGS. 7A and 7B) to notify that the positioning state is degraded, etc. Furthermore, the display processing unit 216 causes the status screen D2 to display the work mode selection field K2 which allows the operator to set the work mode (work accuracy priority).

The display processing unit 216 causes the operation display unit 23 to displays the positioning state while the work vehicle 10 is traveling automatically. Specifically, the display processing unit 216 causes the operation screens D3 and D4 to display an icon K1 (an example of an image of the present invention) representing the positioning state. The display processing unit 216 causes the icon K1 to be displayed in a display mode according to the positioning state. For example, when the positioning state is the high accuracy state, the display processing unit 216 causes the icon K1 to be displayed in green, when the positioning state is degraded, the display processing unit 216 causes the icon K1 to be displayed in orange, and when the positioning state is a positioning-disable state (automatic travel disabled), the display processing unit 216 causes the icon K1 to be displayed in red. When initialization (orientation recognition process) is not completed after the engine is started, the display processing unit 216 causes the icon K1 to be displayed in yellow. The display mode is not limited to color, but may be lit, blinking, etc. Furthermore, the operation control unit 21 may announce sound according to the positioning state. The display processing unit 216 is an example of a display processing unit of the present invention.

Here, the icon K1 also functions as an acceptance unit that accepts operation from the operator to cause the status screen D2 to be displayed (see FIG. 5). For example, when the operator presses down the icon K1 on the operation screen D3 (see FIG. 6A), the display processing unit 216 causes the status screen D2 to be displayed. The operator can select the icon K1 when the operator desires to check the current positioning state, switch the work mode (work accuracy setting), or the like.

The acceptance processing unit 217 accepts various operations from the operator. Specifically, the acceptance processing unit 217 accepts work start command from the operator to cause the work vehicle 10 to start work. In addition, the acceptance processing unit 217 accepts travel stop command from the operator to cause the work vehicle 10 during automatic travel to stop traveling. In response to that the acceptance processing unit 217 accepts the each commands, the output processing unit 215 outputs each commands to the work vehicle 10. The acceptance processing unit 217 is an example of an acceptance processing unit of the present invention.

Upon obtaining the work start instruction from the operation terminal 20, the travel processing unit 111 of the work vehicle 10 causes the work vehicle 10 to start automatic travel and work. Furthermore, upon acquiring a travel stop instruction from the operation terminal 20, the travel processing unit 111 causes the work vehicle 10 to stop automatic travel and work.

The acceptance processing unit 217 also accepts a selection operation to select the work mode ("WORK ACCURACY PRIORITY" or "WORK CONTINUATION PRIORITY") on the status screen D2 when starting work with the work vehicle 10. When the acceptance processing unit 217 accepts the selection operation, the output processing unit 215 outputs work mode information representing the selected work mode to the work vehicle 10. Upon obtaining the work mode information, the setting processing unit 112 of the work vehicle 10 sets the work mode to the selected work mode ("WORK ACCURACY PRIORITY" or "WORK CONTINUATION PRIORITY").

Here, when the work mode is set to the work accuracy priority, the travel processing unit 111 causes the work vehicle 10 to stop (temporarily stop) automatic travel if the positioning state is degraded from the high accuracy state while the work vehicle 10 is automatically traveling with the RTK method positioning. In this case, the display processing unit 216 causes the operation display unit 23 to display the notification screen D5 shown in FIG. 7A, for example. For example, the display processing unit 216 causes the notification screen D5 shown in FIG. 7A to display a message M1 indicating that the positioning accuracy is deteriorated and that the work vehicle 10 waits until the positioning accuracy is improved (recovered).

In contrast, when the work mode is set to the work continuation priority, the travel processing unit 111 causes the work vehicle 10 to stop (temporarily stop) automatic travel with the DGPS method positioning if the positioning state is degraded from the high accuracy state while the work vehicle 10 is automatically traveling with the RTK method positioning. In this case, the display processing unit 216 causes the operation display unit 23 to display the notification screen D5 shown in FIG. 7B, for example. For example, the display processing unit 216 causes the notification screen D5 shown in FIG. 7B to display a message M2 indicating that the positioning accuracy is deteriorated and that automatic travel is continued for 60 seconds. The display processing unit 216 causes the message M2 to be displayed for a predetermined time (e.g., 1 second), and causes the message M2 to be deleted after the predetermined time period elapses, and causes the operation screen D4 (see FIG. 6B) to be redisplayed. In this way, by setting the display time of message M2 to a short time period, the operator can check a work status on the operation screen D4 while the automatic travel is still continued with the DGPS method positioning.

Note that the operation terminal 20 may be accessible to a web site of agricultural support services (agricultural support site) provided by a server (not illustrated) via the communication network N1. In this case, a browser program is executed by the operation control unit 21, thereby making it possible for the operation terminal 20 to function as a terminal for operating the server. The server includes each processing units described above and performs each processes.

As another embodiment, some of the functions of the vehicle control device 11 and positioning device 16 described above (e.g., setting processing unit 112 and switching processing unit 172) may be included in the operation control unit 21 of the operation terminal 20. For example, the operation control unit 21 may execute the process of acquiring the positioning state to switch the positioning method. The operation control unit 21 may also set the work mode of the work vehicle 10 based on the selection operation of the work mode by the operator.

Automatic Travel Process

Figure 8:
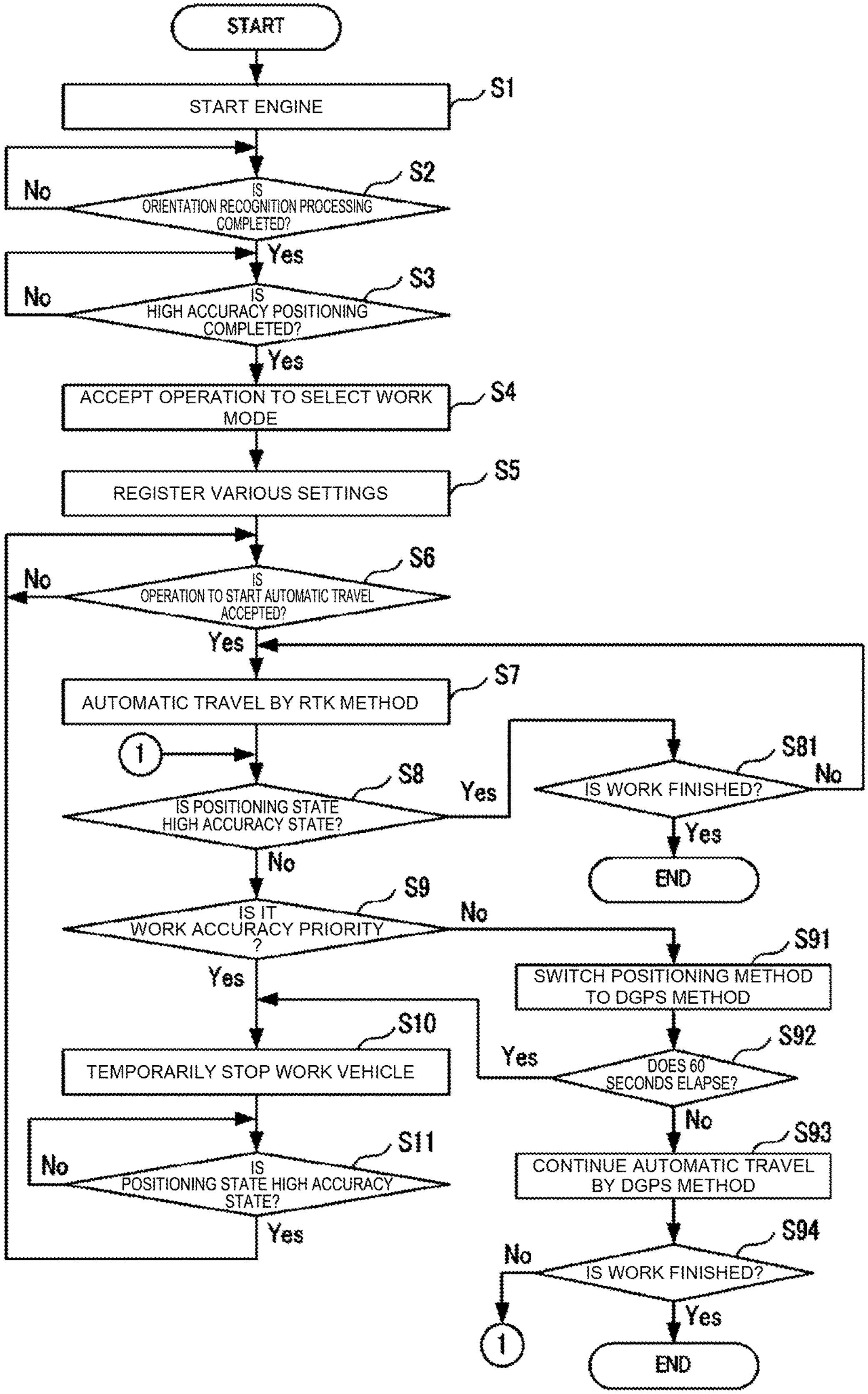
FIG. 8 is a flowchart illustrating an example of a procedure of an automatic travel process executed by an automatic travel system according to an embodiment of the present invention.

Hereinafter, an example of the automatic travel process executed by the vehicle control device 11, the positioning control unit 161, and the operation control unit 21 will be described with reference to FIG. 8. For example, the automatic travel process is initiated by the vehicle control device 11, the positioning control unit 161, and the operation control unit 21 when the engine 131 of the work vehicle 10 is started and power of the operation terminal 20 is turned on.

The present invention may be taken as an invention of an automatic travel method for executing a part or all of the automatic travel process by the vehicle control device 11, the positioning control unit 161, and the operation control unit 21, or as an invention of an automatic travel program for causing the vehicle control device 11, the positioning control unit 161, and the operation control unit 21 to execute a part or all of the automatic travel method. One or more processors may execute the automatic travel process.

In step S1, the vehicle control device 11 causes the engine 131 of the work vehicle 10 to be started in response to the engine start operation by the operator. When the engine 131 is started, the positioning control unit 161 executes orientation recognition process (initialization). The operation control unit 21 turns on the power of the operation terminal 20 in response to the power ON operation by the operator and causes the operation terminal 20 to display the menu screen D1 (see FIG. 4).

Next, in step S2, the positioning control unit 161 determines whether or not the orientation recognition process (initialization) is completed. When the orientation recognition process is completed (S2: Yes), the process moves to step S3. If the positioning control unit 161 cannot complete the orientation recognition process, it waits until the orientation recognition process is completed (S2: No).

In step S3, the positioning control unit 161 determines whether or not the high accuracy positioning is completed. When the high accuracy positioning is completed (S3: Yes), the process moves to step S4. If the positioning control unit 161 cannot complete the high accuracy positioning, it waits until the high accuracy positioning is completed (S3: No). The operator can press down the icon K1 on the menu screen D1 to display the status screen D2 (see FIG. 5) and check the positioning state on the status screen D2.

In step S4, the operation control unit 21 accepts a selection operation to select the work mode. Specifically, the operation control unit 21 accepts a selection operation to select either "WORK ACCURACY PRIORITY" or "WORK CONTINUATION PRIORITY" in the work mode selection field K2 of the status screen D2 (see FIG. 5). For example, the operator selects "WORK ACCURACY PRIORITY" when desiring to prioritize work accuracy, and the operator selects "WORK CONTINUATION PRIORITY" when desiring to prioritize work efficiency. The operation control unit 21 outputs work mode information representing the selected work mode to the work vehicle 10. When the vehicle control device 11 obtains the work mode information, the vehicle control device 11 sets the work mode to the selected "WORK ACCURACY PRIORITY" or "WORK CONTINUATION PRIORITY".

Next, in step S5, the operation control unit 21 registers various pieces of set information. Specifically, the operation control unit 21 registers the work vehicle information, field information, work information, and travel route information. In addition, the operation control unit 21 outputs the travel route information of the generated travel route R to the work vehicle 10.

Next, in step S6, the operation control unit 21 determines whether or not the operation control unit 21 accepts operation to start automatic travel from the operator. For example, when the current position of the work vehicle 10 coincides with the work start position S, the operation control unit 21 accepts operation (pressing down the start button) to start automatic travel from the operator on the operation screen D3 (see FIG. 6A). When the operation control unit 21 accepts the operation to start automatic travel (S6: Yes), the operation control unit 21 outputs the work start instruction to the work vehicle 10. Then, the process moves to step S7. On the other hand, if the operation control unit 21 does not accept the operation to start automatic travel, the operation control unit 21 waits until the operation to start automatic travel is accepted (S6: No).

In step S7, the vehicle control device 11 causes the work vehicle 10 to automatically travel along the travel route R based on the position information positioned by the RTK method.

Next, in step S8, the positioning control unit 161 determines whether or not the positioning state is the high accuracy state. For example, the positioning control unit 161 determines that the positioning state is the high accuracy state when the number of satellites 40 capable of receiving GNSS signals is not less than a predetermined number (e.g., 10) and the evaluated value of GNSS signal quality is a predetermined value. On the other hand, the positioning control unit 161 determines that the positioning state is degraded when the number of satellites 40 capable of receiving GNSS signals is less than the predetermined number (e.g., 10) and the evaluated value of GNSS signal quality is not the predetermined value. The positioning state varies due to influence of obstacles (windbreaks, buildings, etc.) around the work vehicle 10. If it is determined that the positioning state is the high accuracy state (S8: Yes), the process moves to step S81. On the other hand, if it is determined that the positioning state is not the high accuracy state, that is, the positioning state is degraded (S8: No), the process moves to step S9.

Here, the operation control unit 21 causes the operation screen D3 (see FIGS. 6A and 6B) to display the icon K1 in a display mode according to the positioning state. For example, the operation control unit 21 causes the icon K1 to be displayed in green when the positioning state is the high accuracy state, and causes the icon K1 to be displayed in orange when the positioning state is degraded from the high accuracy state.

In step S81, the vehicle control device 11 determines whether or not the work vehicle 10 finishes work. If the work vehicle 10 finishes the work (S81: Yes), the automatic travel process ends. On the other hand, if the work vehicle 10 does not finish the work (No in S81), the process returns to step S7. In this way, if the positioning state is not degraded, the vehicle control device 11 performs automatic travel using positioning by the RTK method until the predetermined work according to the travel route R is finished.

In step S9, the vehicle control device 11 determines whether or not the work mode is set to the work accuracy priority. If the work mode is set to work accuracy priority (S9: Yes), the process moves to step S10. On the other hand, if the work mode is set to the work continuation priority (S9: No), the process moves to step S91.

In step S10, the vehicle control device 11 causes the work vehicle 10 during automatic travel to stop temporarily. The operation control unit 21 causes the operation terminal 20 to display the notification screen D5 shown in FIG. 7A, and causes the notification screen D5 to display a message M1 indicating that the positioning accuracy is deteriorated and that the work vehicle 10 waits until the positioning accuracy is improved (recovered). Furthermore, the operation control unit 21 causes the notification screen D5 to display the icon K1 in orange.

Next, in step S11, the positioning control unit 161 determines whether or not the positioning state is a high accuracy state. That is, the positioning control unit 161 determines whether or not the positioning state is recovered to a state where positioning by the RTK method is possible. If it is determined that the positioning state is a high accuracy state (S11: Yes), the process moves to step S6. On the other hand, if the positioning state is not a high accuracy state, that is, if the positioning state remains degraded and is not recovered, the work vehicle 10 waits until the positioning state is recovered to the high-precision state (S11: No). The work vehicle 10 waits in a temporarily stopped state until the positioning state is recovered to the high accuracy state. For example, by the operator manually moving the work vehicle 10 to a predetermined location, there is a case where the positioning state is recovered to the high accuracy state. When the positioning state is recovered to the high accuracy state (S11: Yes) and the operation control unit 21 accepts operation to start automatic travel from the operator (S6: Yes), the vehicle control device 11 resumes automatic travel of the work vehicle 10 along the travel route R (S7) based on the position information positioned by the RTK method.

In contrast, in step S91, the positioning control unit 161 switches the positioning method from the RTK method to the DGPS method. The positioning control unit 161 starts measuring time after switching the positioning method from the RTK method to the DGPS method. Next, in step S92, the positioning control unit 161 determines whether or not the measured time exceeds a predetermined time (e.g., 60 seconds). If the measured time does not exceed 60 seconds (S92: No), the process moves to step S93. On the other hand, if the measured time exceeds 60 seconds (S92: Yes), the process moves to step S10.

In step S93, the vehicle control device 11 causes the work vehicle 10 to continue automatic travel along the travel route R based on the position information positioned by the DGPS method. The operation control unit 21 causes the operation terminal 20 to display the notification screen D5 shown in FIG. 7B, and causes the notification screen D5 to display the message M2 indicating that positioning accuracy is deteriorated and that automatic travel continues for 60 seconds. Furthermore, the operation control unit 21 causes the notification screen D5 to display the icon K1 in orange.

Next, in step S94, the vehicle control device 11 determines whether or not the work vehicle 10 finishes the work. If the work vehicle 10 finishes the work (S94: Yes), the automatic travel process ends. On the other hand, if the work vehicle 10 does not finish the work (S94: No), the process returns to step S8. In this way, if the work mode is set to the work continuation priority and the positioning state is not the high accuracy state (S9: No), the vehicle control device 11 causes the work vehicle 10 to automatically travel for 60 seconds by the DGPS method. If the work vehicle 10 is continuing automatic travel by the DGPS method and the positioning state is recovered to the high accuracy state before the work is completed (S8: Yes), the vehicle control device 11 switches the positioning method to the RTK method to resume automatic travel (S7).

On the other hand, if the measured time exceeds 60 seconds (S92: Yes) and the process moves to step S10, the vehicle control device 11 causes the work vehicle 10 during automatic travel to stop temporarily. The work vehicle 10 waits in a temporarily stopped state (S11: No) until the positioning state is recovered to the high accuracy state. Thereafter, if the positioning state is recovered to the high accuracy state (S11: Yes), the process moves to step S6. If the operation control unit 21 accepts the operation to start automatic travel from the operator in step S6 (S6: Yes), the vehicle control device 11 causes the work vehicle 10 to resume automatic travel along the travel route R (S7) based on the position information positioned by the RTK method.

The vehicle control device 11, the positioning control unit 161, and the operation control unit 21 execute repeatedly processes of steps S1 to S11 until the work vehicle 10 finishes the work.

As described above, the automatic travel system 1 according to the present embodiment positions the work vehicle 10's position by the predetermined positioning method based on the satellite signal (GNSS signal) received from the satellite 40, and causes the work vehicle 10 to automatically travel based on the position information of the work vehicle 10. The automatic travel system 1 can mutually switch between a first positioning method (e.g., RTK method) and a second positioning method (e.g., DGPS method, standalone positioning method), which has lower positional accuracy of positioning than the first positioning method. Furthermore, the automatic travel system 1 sets the work mode of the work vehicle 10 either to the first work mode (a work accuracy priority) to stop automatic travel of the work vehicle 10 when the positioning state is degraded from the predetermined state (high accuracy state), or to the second work mode (a work continuation priority) to continue automatic travel of the work vehicle 10 when the positioning state is degraded from the predetermined state. The automatic travel system 1 switches between the first positioning method and the second positioning method based on the work mode and the positioning state.

For example, when the work mode is set to the work accuracy priority, the automatic travel system 1 causes the work vehicle 10 to automatically travel on the basis of the position information by the RTK method if the positioning state is the high accuracy state, and the automatic travel system 1 causes the work vehicle 10 to stop automatic travel if the positioning state is degraded from the high accuracy state.

For example, when the work mode is set to the work continuation priority and the positioning method is set to the RTK method, and if the positioning state is degraded from the high accuracy state, the automatic travel system 1 switches the positioning method to the DGPS method. That is, when the work mode is set to the work continuation priority, if the positioning state is the high accuracy state, the automatic travel system 1 causes the work vehicle 10 to travel automatically on the basis of the position information by the RTK method, and if the positioning state is degraded from the high accuracy state, the automatic travel system 1 causes the work vehicle 10 to travel automatically on the basis of the position information by a DGPS method.

According to the configuration described above, for example, when the operator sets the work mode to prioritize work accuracy ("WORK ACCURACY PRIORITY"), the work vehicle 10 is temporarily stopped if the positioning state is degraded. This prevents the work accuracy from being deteriorated by the work vehicle 10 continuing its automatic travel with positional accuracy being degraded.

In contrast, for example, when the operator sets the work mode to prioritize work efficiency ("WORK CONTINUATION PRIORITY"), the work vehicle 10 continues automatic travel without temporarily stopping if the positioning state is degraded. This prevents the work efficiency from being decreased by the work vehicle 10 stopping automatic travel.

Other Embodiments

The present invention is not limited to the above mentioned embodiments, but may be the following embodiments.

In the embodiment described above, the operator can set the work mode to the work accuracy priority or the work continuation priority for the entire work area (inner-field route R1 and outer-field route R2) of the field F. Here, in the work area of the outer-field route R2 of the field F, a high positional accuracy is required because the boundary of the field F is close. For example, the work vehicle 10 may jump out of the field F if it automatically travels along the outer-field route R2 by a positioning method with low positional accuracy.

Therefore, as another embodiment, the operation control unit 21 may be configured to permit acceptance of the selection operation to select the work continuation priority for the inner area in the field F (an example of the first area of the present invention) and prohibit acceptance of the selection operation to select the work continuation priority for the outer area in the field F (an example of the second area of the present invention). According to this configuration, for example, the work vehicle 10 automatically traveling on the inner-field route R1 switches the positioning method to the DGPS method and continues to travel automatically when the positioning state is degraded, while the work vehicle 10 automatically traveling on the outer-field route R2 does not switch the positioning method and temporarily stops when the positioning state is degraded. This prevents the work vehicle 10 from jumping out of the field F.

In the embodiment described above, the vehicle control device 11 sets the work mode based on the selection operation of the work mode ("WORK ACCURACY PRIORITY" or "WORK CONTINUATION PRIORITY") by the operator. As still another embodiment, the vehicle control device 11 may set the work mode in the current position information by referring to the storage unit 12 that stores the positioning state and the position information when the work vehicle 10 traveled in the past in association with each other. For example, the positioning state in the field F and the position information of the work vehicle 10 during past work are associated with each other, and stored in the storage unit 12. For example, the vehicle control device 11 sets the work mode to work continuation priority by referring to the positioning state associated with position information of the current position of the work vehicle 10 while the work vehicle 10 is traveling automatically. For example, the vehicle control device 11 switches the work mode from work accuracy priority to work continuation priority when the positioning state associated with the position information is close to the high accuracy state or when a position where the positioning state is degraded is within a predetermined range.

For example, when starting automatic travel, the vehicle control device 11 refers to the positioning state stored in the storage unit 12 and sets the work mode to work continuation priority if the field F contains the position where the positioning state is degraded. This allows the work mode to be set without selection operation by the operator. The operation control unit 21 may accept operation from the operator to select whether or not to permit the work mode set by the vehicle control device 11.

Figure 9:
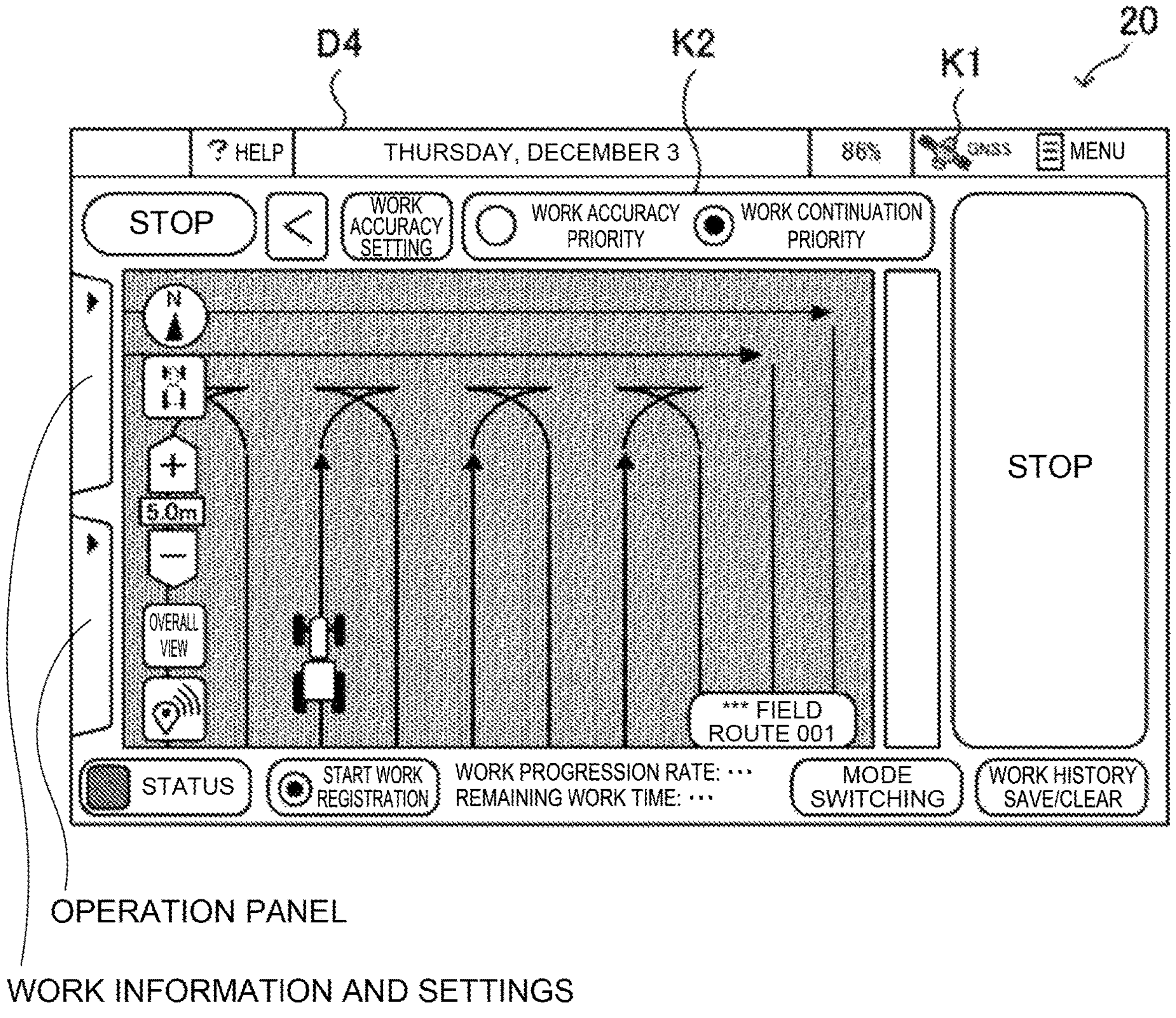
FIG. 9 is a diagram illustrating an example of the operation screen displayed on the operation terminal according to the embodiment of the present invention.

As still another embodiment, the operation control unit 21 may accept operation to select the work mode from the operator on the operation screen D4 (see FIG. 9) while the work vehicle 10 is traveling automatically. For example, as shown in FIG. 9, the operation control unit 21 causes the operation screen D4 to display the work mode selection field K2 to select the work mode, and accepts the operation to select the work mode. Upon accepting the selection operation, the operation control unit 21 outputs the work mode information to the work vehicle 10. Upon obtaining the work mode information, the vehicle control device 11 sets the work mode to the selected work mode ("WORK ACCURACY PRIORITY" or "WORK CONTINUATION PRIORITY"). This allows the operator to set the work mode even while the work vehicle 10 is traveling automatically.

If, for example, the operator sets the work mode to work continuation priority on the status screen D2 when starting automatic travel, the following is concerned if the operator switches the work mode to work accuracy priority while the work vehicle 10 is traveling automatically. For example, if the operator switches the work mode to work accuracy priority while the work vehicle 10 is continuing automatic travel by the DGPS method because the positioning state is degraded during automatic travel, the vehicle control device 11 causes the work vehicle 10 to suddenly stop at the timing when the work mode is switched to work accuracy priority because the positioning state at the switched time is not a high accuracy state required by the RTK method. It may lead to failure of the work vehicle 10.

Therefore, the operation control unit 21 may be configured not to accept operation to switch the work mode when the work vehicle 10 is traveling automatically. As still another embodiment, the operation control unit 21 may be configured to permit only switching operation from the work accuracy priority to the work continuation priority and prohibit switching operation from the work continuation priority to the work accuracy priority while the work vehicle 10 is traveling automatically. In this case, the operation control unit 21 may cause operation screen D4 shown in FIG. 9 to display only "WORK CONTINUATION PRIORITY" as selectable, and display "WORK ACCURACY PRIORITY" as hidden or grayscale.

As still another embodiment, when the work vehicle 10 is traveling automatically, the operation control unit 21 may be configured to permit only switching operation to the work continuation priority if the work mode is set to the work accuracy priority and the position of the work vehicle 10 is within a predetermined distance (e.g., 1 m) from the boundary of the field F.

As still another embodiment, when the work vehicle 10 is traveling automatically, the operation control unit 21 may be configured to permit switching operation of the work mode if the positioning state is a high accuracy state and the position of the work vehicle 10 is within a predetermined distance (e.g., 1 m) from the boundary of the field F. These configurations can prevent concern about sudden stop of the work vehicle 10 described above.

The operation control unit 21 may cause the operation screen D4 (see FIG. 9) to display (pop-up display) the work mode selection field K2 on the condition that the operation control unit 21 is ready to accept switching operation of the work mode.

As still another embodiment, the vehicle control device 11 may set the work mode based on the type of work machine 14 mounted on the work vehicle 10 or the work content of the work vehicle 10. For example, a high accuracy is not required when the work is cultivating, but a high accuracy is required when the work is seeding. Thus, the vehicle control device 11 sets the work mode to work continuation priority when the work machine 14 is a cultivator or when the work content is cultivation work. In contrast, the vehicle control device 11 sets the work mode to work accuracy priority when the work machine 14 is a seeding machine or when the work content is seeding work.

The invention claimed is:

1. An automatic travel method comprising:

determining position information of a work vehicle using a first positioning method based on a satellite signal received from a satellite;

causing the work vehicle to automatically travel based on the position information of the work vehicle;

setting a work mode of the work vehicle either to a first work mode or a second work mode, wherein:

in response to a positioning state of the first positioning method being degraded from a predetermined state and the work mode being set to the first work mode, the work vehicle is caused to stop automatic travel, and in response to the positioning state of the first positioning method being degraded from the predetermined state and the work mode being set to the second work mode, the work vehicle is caused to continue automatic travel based on second position information of the work vehicle that is determined using a second positioning method based on a second satellite signal received from the satellite or a second satellite, the second positioning method having a lower positional accuracy than the first positioning method, and the positioning state indicating an accuracy of the position information determined by the first positioning method; and switching between the first positioning method and the second positioning method based on the set work mode and the positioning state; and restricting switching based on the required level of accuracy for the current type of work being performed.

2. The automatic travel method according to claim 1, wherein, based on the work mode being set to the first work mode:

the work vehicle is caused to automatically travel based on the position information by the first positioning method based on the positioning state being the predetermined state, and the work vehicle is caused to stop automatic travel based on the positioning state being degraded from the predetermined state.

3. The automatic travel method according to claim 1, wherein, based on the work mode being set to the second work mode:

the work vehicle is caused to automatically travel based on the position information determined by the first positioning method when the positioning state is the predetermined state, and the work vehicle is caused to automatically travel based on the second position information determined by the second positioning method when the positioning state is degraded from the predetermined state.

4. The automatic travel method according to claim 1, wherein automatic travel of the work vehicle is started using the first positioning method based on the positioning state being the predetermined state.

5. The automatic travel method according to claim 1, wherein the work mode is set based on a selection operation to select either the first work mode or the second work mode by a user.

6. The automatic travel method according to claim 5, further comprising:

causing an operation terminal to display the positioning state; and accepting the selection operation at the operation terminal based on the positioning state being degraded from the predetermined state while the work vehicle is traveling automatically.

7. The automatic travel method according to claim 5, further comprising:

permitting acceptance of the selection operation to select the second work mode for a first area within a field; and prohibiting acceptance of the selection operation to select the second work mode for a second area outside the first area within the field.

8. The automatic travel method according to claim 1, wherein the work mode is set based on a past positioning state associated with a current position information by referring to a storage unit that stores, in association with one another, the positioning state and the position information of past traveling of the work vehicle.

9. The automatic travel method according to claim 1, wherein the work mode is set based on a type of a work machine mounted on the work vehicle or a work content of the work vehicle.

10. The automatic travel method according to claim 1, further comprising:

causing an operation terminal to display an image representing the positioning state; and causing the image to be displayed in a display mode according to the positioning state.

11. An automatic travel system comprising:

a positioning processing unit that determines position information of a work vehicle using a first positioning method based on a satellite signal received from a satellite;

a travel processing unit that causes the work vehicle to automatically travel based on the position information;

a setting processing unit that sets a work mode of the work vehicle either to a first work mode or a second work mode, wherein:

in response to a positioning state of the first positioning method being degraded from a predetermined state and the work mode being set to the first work mode, the work vehicle is caused to stop automatic travel, and in response to the positioning state of the first positioning method being degraded from a predetermined state and the work mode being set to the second work mode, the work vehicle is caused to continue automatic travel based on second position information of the work vehicle that is determined using a second positioning method based on a second satellite signal received from the satellite or a second satellite, the second positioning method having a lower positional accuracy than the first positioning method, and the positioning state indicating an accuracy of the position information determined by the first positioning method; and a switching processing unit that switches between the first positioning method and the second positioning method based on the work mode set by the setting processing unit and the positioning state, the switching processing unit further configured to:

restrict switching based on the required level of accuracy for the current type of work being performed.

12. A non-transitory, computer readable medium storing an automatic travel program including instructions that, when executed by one or more processors, cause the one or more processors to:

determine position information of a work vehicle using a first positioning method based on a satellite signal received from a satellite;

cause the work vehicle to automatically travel based on the position information;

set a work mode of the work vehicle either to a first work mode or a second work mode, wherein:

in response to a positioning state of the first positioning method being degraded from a predetermined state and the work mode being set to the first work mode, the work vehicle is caused to stop automatic travel, and in response to the positioning state of the first positioning method being degraded from a predetermined state and the work mode being set to the second work mode, the work vehicle is caused to continue automatic travel based on second position information of the work vehicle that is determined using a second positioning method based on a second satellite signal received from the satellite or a second satellite, the second positioning method having a lower positional accuracy than the first positioning method, and the positioning state indicating an accuracy of the position information determined by the first positioning method; and switch between the first positioning method and the second positioning method based on the set work mode and the positioning state; and restrict switching based on the required level of accuracy for the current type of work being performed.

* * * * *